June 9, 1964

J. A. SMYSER 3,135,997

ADJUSTABLE TIRE MOLD

Filed July 17, 1961

JAMES A. SMYSER
INVENTOR
HUEBNER & WORREL
ATTORNEYS
BY Richard M. Worrel

June 9, 1964    J. A. SMYSER    3,135,997
ADJUSTABLE TIRE MOLD
Filed July 17, 1961    2 Sheets-Sheet 2
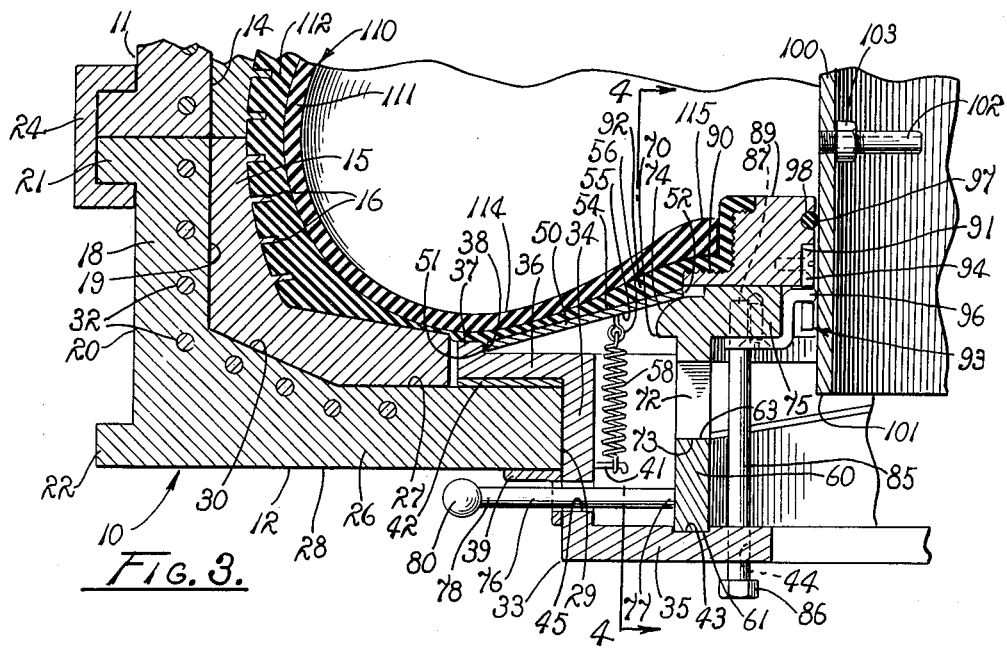
Fig. 3.
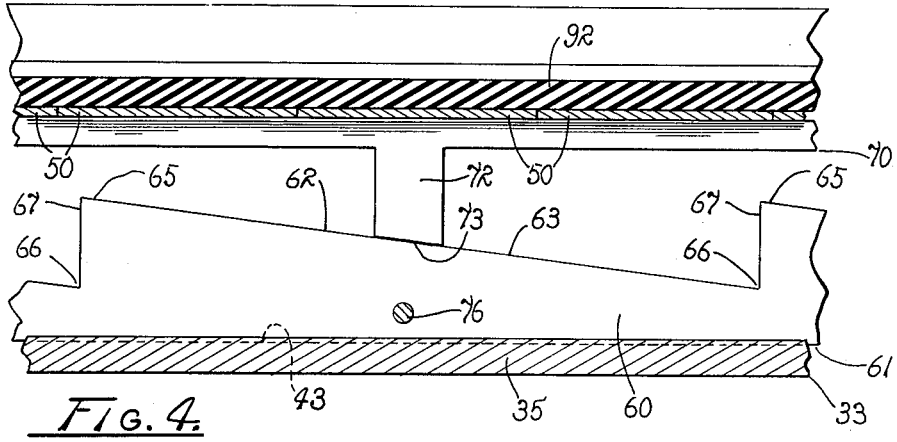
Fig. 4.
Fig. 5.
JAMES A. SMYSER
INVENTOR
HUEBNER & WORREL
ATTORNEYS
BY
Richard M. Worrel

United States Patent Office 3,135,997
Patented June 9, 1964

3,135,997
ADJUSTABLE TIRE MOLD
James A. Smyser, 714 E St., Taft, Calif.
Filed July 17, 1961, Ser. No. 124,527
7 Claims. (Cl. 18—18)

The present invention relates to an adjustable tire mold for forming a tread in a tire casing and more particularly to such a mold wherein the tread receiving portion of the tire is forced against the tread forming wall of the mold by inflating the casing and wherein the mold accommodates various sizes and patterns of tread forming matrices and bead support rings the latter of which are adjustably conformable to fluctuations in the peripheral dimension between beads occurring in successive tires of the same wheel size. This application is a continuation-in-part of my co-pending application, Serial No. 52,858, entitled Flexible Mold for Automobile Tires, filed August 30, 1960.

As is well known, the manufacture and retreading of tires includes the formation of a tread on the outer wall of the tire casing. In tire retreading, for example, the old casing is buffed smooth of its treads and then circumscribed by a so-called camelback, that is a tread-impressionable strip of rubber, which is bonded to the buffed casing.

It is well known that the diameters of the beads of casings of the same size are substantially uniform no matter what their source. This is necessitated by the required mounting of the casings on standard rims for use. However, because of differences in design, quality, tread thickness and the like, casings of a given size vary considerably in their bead-to-bead peripheral dimensions measured externally in axial planes radial to the casings. This circumstance has resulted in substantial malformations and rejections as tread is applied to casings of different peripheral dimensions in fixed cavity molds. When casings having excessive peripheral dimensions are employed in a fixed cavity mold too small conveniently to accommodate them, efforts to inflate the casings result in inward collapsing or folding known in the art as "buckling" or "peaking." Buckling and peaking preclude successful tire completion and are productive of excessive rejects.

In recognition of this problem, it has been known to provide molds having side walls which may move axially. In such molds, the beads, while maintaining a constant diameter, are permitted to move apart. Inasmuch as the side walls of the casings are normally inwardly convergent, such outward or axial movement as the casings are inflated results in wedging of the casing into a fixed cavity peripheral portion thereof. While such molds have constituted an improvement, they have not been entirely successful in solving the problems. As the side walls of such molds move axially they leave gaps adjacent to the fixed peripheral portions of the mold and objectionably mark the side walls of the tires. Further, they have required the cumbersome employment of rims and bags to achieve adequate inflation pressures which require excessive and laborious effort for their employment.

Efforts to eliminate the bag and to press the camelback against the mold by direct inflation of the casing have been unsuccessful in fixed cavity molds. During expansion, the casing must be enclosed to prevent escape of air between the beads. This has been impossible in the prior devices because of the varied peripheral dimensions between the beads of casings intended to fit the same size wheel. When a tire having relatively closely spaced beads is inserted into a conventional mold, the beads cannot be accurately expanded to insure an air-tight seal against the bead support rings disposed therein.

The instant invention as well as that of my co-pending patent application Serial No. 52,858, filed August 3, 1960, is directed to the solution of these problems. Both designs utilize pivotal side walls which permit controlled bead movement outwardly properly to fill the fixed cavity portions of the molds and yet provide continuity between the flexible side wall portions and the rigid portions effectively to avoid objectionable tire marking. Further, for reasons which will subsequently be described, these molds avoid the necessity of employing conventional rings and bags. The present invention is distinguished over that of my prior co-pending application in the utilization of continuous annular side wall portions of flexible elastic material in all respects obviating objectionable side wall marking and in the provisions of improved adjustability to tires of varied sizes.

Accordingly, it is an object of the present invention to provide a universally adjustable mold for confining a tire casing during manufacture, repair, recapping and the like.

Another object is to provide such a mold which permits limited axial flexing of the side walls and beads of the tire but which is diametrically rigid.

Another object is to provide a tire mold for tubeless tires which permits limited axial flexing or expansion of the side walls of the tire to maintain substantially air-tight integrity so as to permit diametric expansion.

Another object is to minimize the time, expense, labor, and inconvenience in tire mold operations.

Another object is to eliminate the conventional bags and the problems incident thereto in manufacturing and retreading tires.

Another object is to maintain an air seal with the beads of a tire casing by permitting limited flexing of the side walls and beads to minimize distortion of the tread portion of the tire casing incident to inflation thereof during manufacturing and retreading tires.

Another object is to provide a universally adjustable mold which accommodates various sizes of tires and tread forms.

Another object is to provide a universally adjustable tread forming mold adapted for, but not restricted to, installation in a conventional press or clam-shell type apparatus.

Other objects are to provide a universally adjustable mold of the type described which is durable in construction, dependable in action, and highly effective for accomplishing its intended purposes.

These, together with other objects will become more fully apparent upon reference to the following description and accompanying drawings wherein elements common to both the present and the parent application are identified by the same reference numerals except where the configuration of such elements is substantially changed.

In the drawings:

FIG. 3 is a somewhat enlarged, fragmentary, radial section taken on a plane at a position represented by line 3—3 in FIG. 2 and showing the tire casing in deflated condition and an annular supporting plate in relaxed position is dashed lines.

FIG. 4 is a fragmentary section taken on a plane at a position represented by line 4—4 in FIG. 3.

FIG. 5 is a fragmentary elevation of the inner periphery of the mold showing the tire bead support ring locking device.

Figure 1:
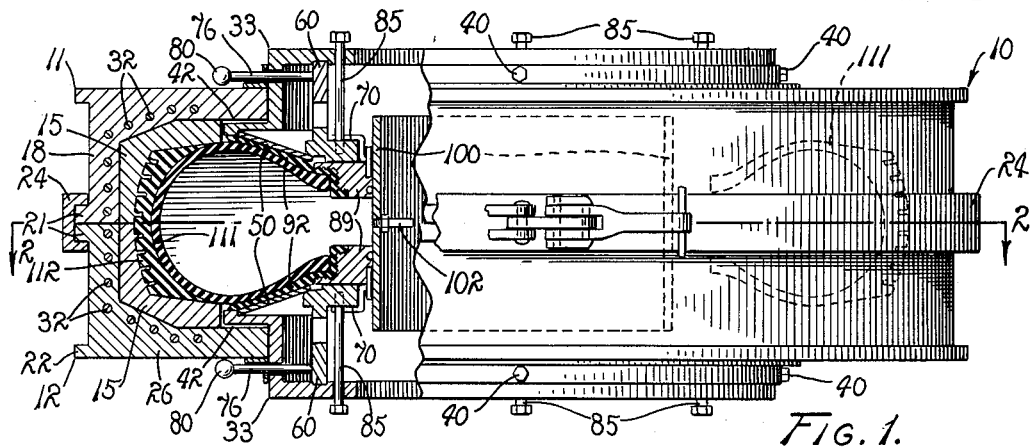
FIG. 1 is a side elevation of a mold embodying the principles of the present invention with portions thereof in section and broken away to show the construction of internal portions of the mold and with an inflated tire casing positioned in the mold.
Figure 2:
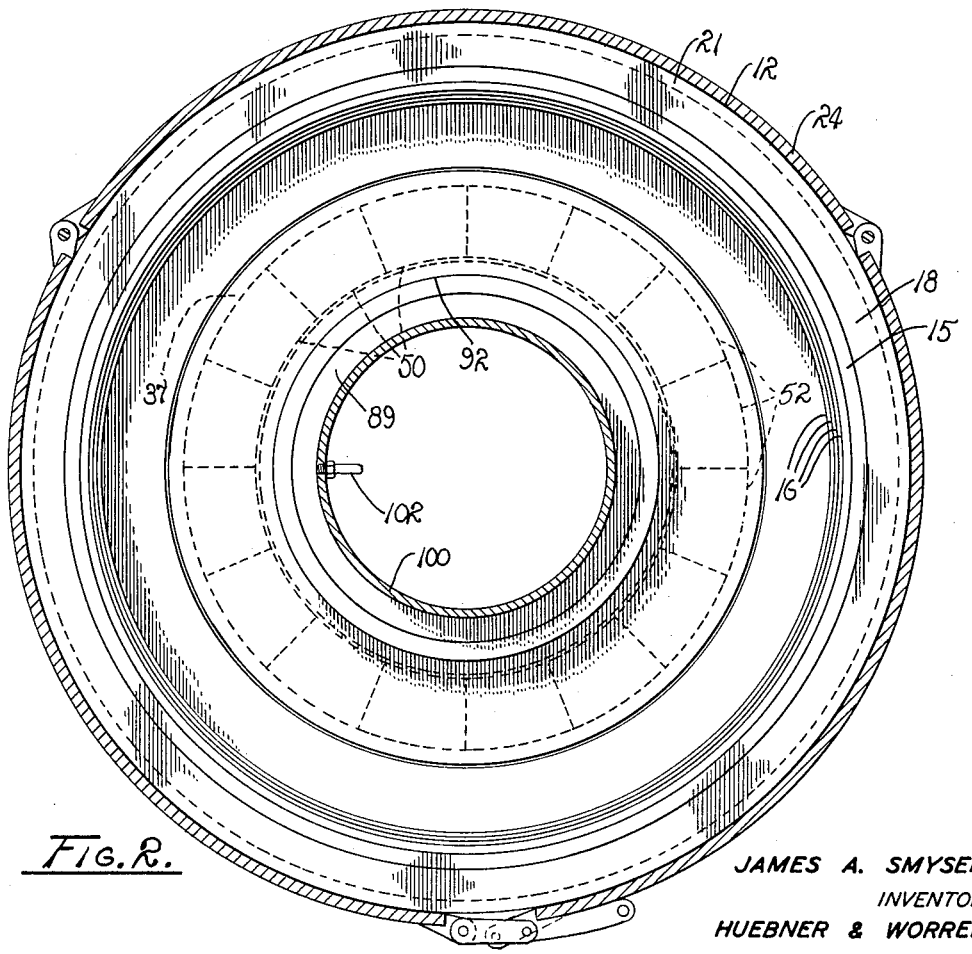
FIG. 2 is a diametric section taken on a plane at a position represented by line 2—2 of FIG. 1 but with the tire casing removed.

Referring more particularly to the accompanying drawings, the mold of the subject invention includes an annular body 10 having identically opposed, releasably interconnected upper and lower sections 11 and 12, respectively, which define a generally doughnut-shaped or torus cavity 14 concentric to a predetermined axis of reference. It is to be understood that the body is operable in any attitude desired but for convenience of description, it is illustrated in a horizontal position. Therefore, the sections are referred to as being upper and lower and said predetermined axis as being vertical.

A matrix drum 15 having upper and lower sections corresponding to the sections of the body 10 provides a plurality of annular, radially inwardly extended blades 16 disposed concentrically within the cavity. The matrix drum 15 is provided in a number of wall thicknesses and blade configurations to accommodate various sizes of tires for impressing any desired tread formations thereon. Inasmuch as both of the lower and upper sections 11 and 12 of the body are identical in construction only one is described in detail. With particular reference to FIG. 3, the lower section therefore includes an axially extended outer wall 18 providing an inner surface 19 and an outwardly disposed annular recess 20 between a central rim 21 and an end rim 22 both of which circumscribe the wall. An adjustable clamp 24 releasably circumscribes the upper and lower sections of the body in clamping engagement with central rims 21 of the upper and lower sections.

The body 10 also includes axially opposed side walls 26 each having spaced substantially parallel inner and outer annular surfaces 27 and 28 respectively inwardly extended from the outer wall 18 in generally perpendicular relation to said predetermined axis of reference. The side wall 26 terminates inwardly of the outer wall 18 in an annular inner surface 29. An annular angular surface 30 extended in generally oblique relation to the predetermined axis of reference, interconnects the inner surface 19 and 27 of the body to define the cavity 14. A plurality of heating elements 32 are embedded in the outer and side walls of the body 10.

An annular tire side wall support housing 33 provides an axially extended side wall 34 which is received radially inwardly of the inner annnular surface 29 of the side walls 26 of the body 10. The side wall 34 includes an axially outer radially inwardly extended flange 35 and an opposite axially inner, radially outwardly extended flange 36. An axially inwardly extended ring 37 is formed on the outer end of the flange 36 closely adjacent to the matrix drum 15 to define a shoulder 38. The side wall support housing 33 is connected to the body 10 by an annular mounting ring 39 rigidly secured to the side wall 34 by a plurality of peripherally spaced capscrews 40. A plurality of dowel pins or pegs 41 are mounted on the inner annular surface of the side wall 34 in radially inwardly projecting relation for a purpose soon to become apparent. A substantially flat annular cam supporting groove 43 is disposed about the inner surface of the outer flange 35 which also provides a plurality of annularly spaced apertures 44 extended therethrough radially inwardly of the groove. A circumferentially extended slot 45 is provided in the side wall 34 for a purpose soon to become apparent.

A plurality of tire side wall support plates 50 individually provide outer convex edges 51 engaging the shoulder 38 on the inner flange 36 of the support housing 33. The plates are annularly disposed about the flange 36 in side-by-side edgewardly engaging relation to each other which radially inwardly extend beyond the side wall 34 thereof to provide a continuous annular ring terminating in individual concave inner edges 52 concentric about the predetermined axis of reference. The ring formed by the individual plates 50 is thereby axially movable with a minimum of distortion. Each of the plates also provides smooth inner and outer surfaces 54 and 55, respectively, the latter of which rigidly mounts a depending hook member 56. Coil tension springs 58 interconnect each of the hooks 56 with corresponding pegs 41 on the side wall 34 of the housing normally to urge the plates 50 in an axially outward direction toward the outer flange 35 of the support housing 33. The bead supporting and adjusting member of the present invention is provided for the inner edges of the plates to support and adjustably to actuate the same in a manner to be described in greater detail.

With particular reference to FIGS. 3 and 4, an annular camming ring 60 concentrically circumscribes the axis of the matrix body 10 and has a mounted edge 61 slidably rested on the cam supporting surface 43. The ring has an upper serrated camming edge 62 including a plurality of circumferentially spaced, inclined ramps 63 having upper peaks 65 and lower valleys 66. Adjacent ramps are joined by axially extended shoulders 67 interconnecting the valley of one ramp to the peak of the next successive ramp.

An annular plate supporting ring 70 concentrically circumscribes the axis of the body 10 and has a plurality of axially extended, circumferentially spaced, downwardly extended cam following legs 72 having lower beveled edges 73 individually, complementarily, slidably engaging the ramps 63. The plate supporting ring has an upper convex plate supporting surface 74 and a radially inwardly disposed upper flat annular ring 75. An elongated handle 76 is slidably received in the slot 45 for movement in a path concentric to said predetermined axis of the body and includes an inner end 77 rigidly connected to the camming ring 60 and an outer end 78 disposed through the slot 45. A knob 80 is connected to the outer end of the handle for facilitating manual control of the handle.

A plurality of elongated mounting rods 85 having axially outwardly extended head ends 86 are slidably extended through the apertures 44 in the outer flange 35 of the side wall support housing 33. The rods are axially extended in closely spaced relation adjacent to the cam ring 60 and include inner ends 87 which are screw-threadably received in the inner ring 75 of the plate support ring 70.

An annular bead engaging collar 89 is received upon the inner or upper surface of the ring 75 in concentric circumscribing relation to the axis of the body 10 and provides an outer radial shoulder 90 and an opposite annular radially inwardly opening groove 91. A resiliently flexible annular liner ring 92 is bonded to the shoulder 90 and radially outwardly extends therefrom in overlying relation to the side wall support plates 50 and terminates on the ring 37 of the side wall support housing 33. The bead engaging collar 89 is supported in such position upon the plate support ring 70 by a plurality of annular spaced slide locks 93. As best shown in FIG. 5, a plurality of annularly spaced arcuate brackets 94 are individually mounted within the groove 91 in the collar with each bracket including an integral depending hook portion having a horizontally disposed slot 95 opening edgewardly outwardly therefrom. A corresponding number of substantially S-shaped arms 96 are rigidly mounted on the axially outer surface of the ring 75 of the plate support ring 70 with each providing a radially inwardly extended end aligned with the slot 95 in the brackets 94. When engaged the brackets and arms preclude axial separation of the support ring and bead engaging collar. An annular O-ring 97 is disposed in a radially inwardly opening notch 98 in the collar.

An elongated cylindrical sleeve 100 is concentrically positioned with the matrix body 10 with its outer surface axially slidably engaged by the collar 89 and with the O-ring 97 in axial slidable, air-tight engagement therewith. The sleeve has oposite end edges 101 adjacent to the inner edges 29 of the side walls 26. An air supply conduit 102 is radially extended through the sleeve between the collars 89 on the upper and lower sections 11 and 12 and is held in position by a jamb nut 103.

*Operation*

The operation of the described embodiment of the subject invention is believed clearly apparent and is briefly summarized at this point. In considering the operation of this invention, reference is conveniently made to an annular, rubber tire casing 110, of conventional construction, including an outer wall 111 to which is bonded a tread receiving camelback 112 and a pair of flexible side walls 114 radially inwardly extended from the outer wall and terminating in annular beads 115.

In forming treads in the camelback 112 of the tire casing 110, the upper and lower sections 11 and 12 of the body 10 are separated by releasing the clamp 24 and lifting the upper section off of the lower section. It is to be noted that the mold of the subject invention can be incorporated in conventional press or clam-shell types of apparatus. However, for the purpose of the present invention, it is assumed that the body is rested in a horizontal position on any convenient support, not shown. It is also to be understood that the apparatus operates in any attitude although it is most commonly employed in a horizontal position. With the camelback applied to the outer wall 111, the tire casing is positioned in the cavity 14 with the camelback engaging the tread forming wall of the matrix 15 and the downwardly disposed side wall 114 of the tire casing rested on the side wall 26 of the lower section 12. More specifically, the downwardly disposed side wall 114 of the tire casing is supported by the side wall of the matrix drum and extends inwardly in overlying relation to the flexible ring 92 covering the side wall supporting plates 50. The downwardly disposed bead 115 is axially upwardly spaced from the outer flange 35 of the side wall support housing and is rested on the inner portion of the flexible ring 92 on the shoulder 90 of the collar 89.

Thereafter, the sleeve 100 and the upper section 11 of the matrix body 10 are successively positioned in their above described assembled relation with the lower section 12, and the clamp 24 is extended about the upper and lower sections in clamping relation thereto. It is to be noted that the upper tire supporting plate 50 and collar 89 are respectively in engagement with the upwardly disposed side wall 114 and bead 115 of the tire casing 110. During such assembly, the springs 58 urge the plates 50 against the convex surface 74 of the upper supporting ring 70 to retain the supporting ring and the collar 89 in the upper section.

With the heating elements 32 energized in a manner well known in the art, air under pressure is pumped into the cavity 14 through the conduit 102. This expands the tire casing 110 whereby the camelback 112 is forced radially outwardly against the outer wall 18 of the matrix body 10 thereby to impress the heated camelback with the blades 16 and to form a tread in the camelback.

During such expansion, the upper and lower, flexible tire rings 92 yield respectively upwardly and downwardly thereby to provide continuous support for the side walls 114 of the tire casing. Further, the beads 115 are urged tightly against their respective shoulder portion of the ring 92 on the collars 89 during the expansion of the tire casing thereby to seal the beads to the collars in substantially air-tight engagement and to preclude any significant leakage of air therebetween. Inasmuch as the collars are in air-tight engagement with the sleeve, there is no leakage through these paths and expansion of the tire casing is readily effected. When the tread has been formed, air pressure is relieved in the conduit 102 and the beads resiliently return to their relaxed positions.

It is to be noted that the axial positions of the plate supporting rings are adjusted by their corresponding camming rings 60, that is, the handles 76 are moved in the slots in one direction or the other circumferentially of the axis of the mold thereby to urge the plate supporting rings axially inwardly or permit their movement outwardly by the springs 58. More specifically, as the lower camming ring is moved toward the right, as illustrated in FIG. 4, the lower plate supporting ring is urged axially inwardly since the cam following legs 72 ride upwardly along the ramp 63. The collars are also limited in their axial outward movement by engagement of the head ends of the rods 85 with the outer flanges 35 of the side wall support housing 33. It is most significant that the handle 76 may be accurately adjusted to a predetermined setting corresponding to different size tires. Such settings may be accurately calculated to provide the optimum cavity contour to preclude improper curing from buckling or peaking of the casing.

After the air pressure has been turned off in the conduit 102 and pressure is released from the casing, the clamp 24 is disconnected and the upper section 11 and the sleeve 100 are removed to allow the treaded tire casing 110 to be removed from the cavity 14. The parts of the subject mold are thus readily assembled and disassembled in a convenient and rapid manner.

It is significant that the heater housing 10 of the present invention will accommodate various sizes of matrix drums for molding tires of various sizes and tread forms. When replacing a particular size matrix it may also be desirable or necessary to insert or interchange the bead engaging collar 89. With the structure provided by the present invention, such interchange is easily accomplished by rotating the collar in a clockwise direction relative to the support ring 70. Such rotation disengages the arms 96 from the slots 95 in the bracket 94, as viewed in FIG. 5, thereby freeing the collar 89. A bead engaging collar of the desired size is then mounted on the support ring 70 by reversing the above described removing process.

In conventional molds, when the peripheral dimension between the beads of any tire is less than the preceding tire, the beads 115 do not accurately engage the shoulders on the collars 89. The resultant misalignment permits air leakage around the beads and faulty mold operation. With the mold of the present invention, when the smaller tires are encountered, the collars 89 may be precisely adjusted by the cam ring 60 upon actuation of the handle 76. In this manner fluctuations in the bead dimensions of a particular size tire are readily accommodated by speedy and accurate positioning of the bead engaging collars from a position externally of the mold. It is also apparent that during such adjustment of the engaging collars, the side wall support plates 50 are automatically positioned therewith to provide the required tire side wall support. When tires having greater peripheral dimensions are encountered, the mold is similarly adjustable by manipulation of the control handle 76 to expand the mold accurately to accommodate the casing. Such adjustment virtually eliminates curing failures caused by buckling and peaking of the casing.

From the foregoing, it will be evident that a resiliently flexible mold for forming treads on a tire casing and for recapping tires has been provided. The subject mold allows the treads to be formed and camelbacks to be secured in place in inflation of the tire casings and accommodates such inflation and diametric expansion of the casing by accurately adjustably supporting the side walls and beads of the tire casings. The mold obviates the need for and the inconveniences and expenses caused by the conventional bag employed with treading and retreading tubeless tires according to conventional methods.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An adjustable mold, for tire casings having circumscribing tread portions and side walls inwardly convergently extended from the tread portions terminating in axially spaced annular beads, which tires are of substantially uniform diameter measured diametrically of the beads but have varied circumferences measured in axial planes radial thereto, comprising a matrix member having a rigid periphery adapted to receive the tread portions of such casings, two sets of edgewardly adjacent plates, the plates of each set being in annular arrangement and each plate having an outer edge pivotally supported adjacent to the inner edge of the matrix and an inner edge, the plates of the sets inwardly converging and the plates having opposite inner and outer surfaces, a pair of annular members adapted individually internally to engage the plates of such sets, means mounting the annular members for movement axially of the matrix member in concentric relation to the periphery of the matrix member, continuous flexible annular liner rings having inner peripheral portions mounted on each of said annular members and outer portions overlying the inner surfaces of each set of plates disposed for casing engagement, means for inflating the tire casings within the cavity of the matrix member whereby the beads are forced apart spreading the annular members and the liner rings to force the casing into the rigid periphery of the matrix member while pivoting the plates outwardly, and adjustable stop means engageable with the outer surfaces of the plates and the annular members to limit outward movement of the plates, liner rings and annular members to accommodate predetermined tire sizes.

2. An adjustable mold, for tire casings having circumscribing tread portions and side walls inwardly convergently extended from the tread portions terminating in axially spaced annular beads of varied peripheral dimensions measured between the beads radially about the casing, comprising a matrix member having a rigid periphery adapted to receive the tread portions of such casings, a plurality of plates arranged in side by side abutting relation forming a pair of opposite continuous rings defining continuous outer circular edges pivotally mounted adjacent to said matrix member and a continuous inner circular edge, and the plates having inner surfaces facing each other, a pair of annular members supporting said inner edges of the plates, said annular members being movable axially of the matrix member in concentric relation to the periphery of the matrix member, continuous flexible annular liner rings having inner peripheral portions mounted on each of said annular members and outer portions overlying the inner facing surfaces of said opposite plate rings, a sleeve adapted to bridge between the spaced beads of the casing in air-tight sealing relation to said annular members during said axial movement thereof, means for inflating the tire casings within the cavity of the matrix member whereby the beads are forced apart spreading the annular members to pivot the plates relative to the matrix member for forcing the casing into the rigid periphery of the matrix member, and an adjustable stop controllable externally of the mold engageable with the side plates and the annular bead engaging members to limit outward movement of the plates and annular members to a predetermined position so as to establish the optimum mold cavity contour for particular sizes.

3. A tire mold, for receiving an annular tire casing, said casing having side walls generally radially inwardly convergently extended from a circumscribing tread portion and terminating in annular beads, comprising a sleeve circumscribing a predetermined axis of reference and having opposite ends; a matrix drum circumscribing the sleeve having a mold cavity adapted to receive such a tire casing with the casing circumscribing the sleeve, the drum having an outer tread wall radially outwardly spaced from the sleeve and engageable with the tread portion of the casing in the cavity; an annular body having an outer axially extended wall circumscribing the drum, said body including opposed radially inwardly extended end walls borne by said outer wall and terminating in inner annular edges; a pair of side wall support housings each having an axially extended wall concentrically engaging said inner edge of the end walls; a plurality of plates having outer convex edges pivotally supported on said end walls of the body and including opposite inner concave edges, said plates being edgewardly engaged with each other to form a pair of opposite annular rings for supporting the side walls of the casing; bead engaging means mounted on said end walls of the body and supporting the inner edges of the plates and axially slidably engaging the sleeve; seal means carried by the bead engaging means against the sleeve; and adjusting means connected to said bead engaging means for motivating the same axially of the sleeve in air-tight relation therewith into positive engagement with the beads of the tire casing in the cavity whereby the plates are pivoted outwardly of each other by said movement of the bead engaging means in continuous supporting relation to said side walls of the casing.

4. A tire mold for receiving an annular tire casing, said casing having side walls generally radially inwardly convergently extended from a circumscribing tread portion and terminating in annular beads; comprising a sleeve circumscribing a predetermined axis of reference and having opposite ends; a matrix drum circumscribing the sleeve having a mold cavity adapted to receive such a tire casing with the casing circumscribing the sleeve, the drum having an outer tread wall radially outwardly spaced from the sleeve and engageable with the tread portion of the casing in the cavity; an annular body having an outer axially extended wall circumscribing the drum, said body including opposed radially inwardly extended end walls borne by said outer wall and terminating in an annular inner edge; a pair of side wall support housings each having axially extended walls concentrically individually engaging said inner edge of the end walls; two sets of plates each having outer convex edges pivotally supported on said support housings and including opposite inner concave edges, said plates of each set being radially edgewardly engaged with each other to form annular rings; a pair of annular support rings concentric to the drum and axially positioned between said plates and their respective support housing supporting the inner edges of the plates; annular rings of flexible elastic material mounted on each of said annular support rings for engagement with the beads of the casing having radially outwardly extended portions overlying said plates, said elastic rings providing substantially smooth continuous surfaces engaging said side walls of the casing; adjustable control members borne by each of said support housings engaging the support rings, said support rings axially slidably engaging the sleeve; and seals means carried by the support rings against the sleeve, and said control members motivating the support rings axially of the sleeve in air-tight relation therewith whereby the plates are pivoted relative to the support housing for positive engagement of the elastic rings with the beads and side walls of the tire casing in the cavity.

5. A mold, for impressing a tread on an annular tire casing having a tread receiving portion and a pair of opposed flexible sides connected to the tread portion and convergently inwardly extended therefrom to annular beads, comprising an inner sleeve circumscribing a predetermined axis of reference and having opposite ends; an annular mold body having an outer wall and radially inwardly extended end walls terminating in inner edges; an annular matrix drum disposed within the body having an outer tread forming wall concentrically circumscribing the sleeve and a side wall inwardly extended from the outer wall and defining therewith an annular cavity; axially opposite side wall support housings each having an axially extended wall concentrically individually engaging the inner edge of the end walls of the body, each of said support housings including an axially inner flange extended radially outwardly therefrom and an axially spaced outer flange extended radially inwardly therefrom, said drum cavity being adapted to receive such a tire casing in circumscribing relation to the sleeve with the sides of the casing rested in the cavity partially against said inner flanges of the housings and partially divergently inwardly extended with respect to said inner flanges; a plurality of edgewardly engaging plates forming flexible rings individually interposed said sides of the casing and the inner flanges in circumscribing relation to the sleeve and having inner edges inwardly divergently extended relative to the inner flanges; a pair of opposite annular sealing members in axially slidable circumscribing sealing engagement with the sleeve in supporting relation to said inner edges of the plates; flexible liner rings of resilient material rigidly mounted on each of said sealing members in radially outwardly circumscribing relation therefrom and overlying said plates in superimposed congruent relation to accommodate limited axial movement of said side walls of the casing; and means interposed the outer flanges of the housing and their respective sealing members adjustably positioning said sealing members against the adjacent bead of the casing whereby the plates and resilient rings are carried into supporting engagement with said sides of the casing.

6. A mold, for impressing a tread on a tire casing having a tread receiving portion and a pair of side wall portions inwardly convergently extended from said tread portion and terminating in annular beads, comprising a substantially cylindrical sleeve; an annular mold body including opposed substantially identical sections providing an outer axially extended wall and radially inwardly extended end walls terminating in inner edges; an annular matrix drum releasably disposed within the body concentrically circumscribing the sleeve and including opposed substantially identical matrix sections defining a cavity therebetween and providing inner annular edges circumferentially spaced from said sleeve; side walls convergently outwardly extended with respect to each other from their respective inner edges, and releasably interconnected tread forming walls generally axially extended toward each other from their respective side walls and in radially outwardly spaced relation from said inner edges; side wall support housings having axially extended walls individually concentrically engaging said inner edges of the end walls of the body and including opposite inner flanges extended radially outwardly therefrom and axially spaced outer flanges extended radially inwardly therefrom, said cavity within the drum being adapted to receive such a tire casing in circumscribing relation to the sleeve with the tread portion in opposed relation to said tread forming walls and with the side wall portions divergently inwardly extended relative to said side walls of the drum and partially rested on said inner flanges of the side wall support housings, said beads of the casing being inwardly axially spaced from the inner flanges of the housing; a plurality of edgewardly engaging plates forming flexible rings in circumscribing relation to the sleeve having outer peripheral edges pivotally engaging said inner flanges of the housing and inwardly divergently spaced inner edges being axially inwardly spaced from said inner flange of the housing; collars axially slidably circumscribing the sleeve in axially spaced relation to each other for individual engagement with the beads of the casing; resiliently flexible rings rigidly mounted on said collars in overlying relation to said plates engaging the side walls of the casing and the beads to permit limited axially outward movement thereof; individually operated adjustable means interposed the collars and their respectively adjacent outer flanges of the side wall support housings for positioning the collars axially toward and from each other; tension means interconnecting said plates with the outer flange of the housing to maintain said collars in their respective outermost adjusted positions; and air conducting means extended through the sleeves between the collars and in communication with the cavity of the matrix drum for inflating the tire casing and urging the side wall portions and beads thereof into engagement with said resilient ring on said collars and plates.

7. A mold, for impressing a tread on a tire casing having a tread receiving portion and a pair of side wall portions inwardly convergently extended from said tread portion and terminating in annular beads, comprising a substantially cylindrical sleeve; an annular mold body including opposed substantially identical sections providing an outer axially extended wall and radially inwardly extended end walls terminating in inner edges; an annular matrix drum releasably disposed within the body concentrically circumscribing the sleeve and including opposed substantially identical matrix sections defining a cavity therebetween and providing inner annular edges circumferentially spaced from said sleeve; side walls convergently outwardly extended with respect to each other from their respective inner edges, and releasably interconnected tread forming walls generally axially extended toward each other from their respective side walls and in radially outwardly spaced relation from said inner edges; side wall support housings having axially extended walls individually concentrically engaging said inner edges of the end walls of the body and including opposite inner flanges extended radially outwardly therefrom and axially spaced outer flanges extended radially inwardly therefrom, said cavity within the drum being adapted to receive such a tire casing in circumscribing relation to the sleeve with the tread portion in opposed relation to said tread forming walls and with the side wall portions divergently inwardly extended relative to said side walls of the drum and partially rested on said inner flanges of the side wall support housings, said beads of the casing being inwardly axially spaced from the inner flanges of the housing; two sets of edgewardly engaging plates forming flexible rings in circumscribing relation to the sleeve having outer peripheral edges pivotally engaging said inner flanges of the housings and inwardly divergently spaced inner edges being axially inwardly spaced from said inner flanges of the housings; plate support rings circumscribing the sleeve in axially spaced relation to each other having radial edges engaging said inner edges of the plates; collars releasably mounted on said plate support rings in spaced facing relation to each other; resiliently flexible rings rigidly mounted on said collars in overlying relation to said plates engaging the side walls of the casing and the beads to permit limited axially outward movement thereof; individually operated adjustable means interposed the plate support rings and their respectively adjacent outer flanges of the side wall support housings for positioning the collars axially toward and from each other; tension means interconnecting said plates and the axially extended walls of the housing to maintain said collars in their respective outermost adjusted positions; and air conducting means extended through the sleeves between the collars and in communication with the cavity of the matrix drum for inflating the tire casing and urging the side wall portions and beads thereof into engagement with said resilient rings on said collars and plates.

References Cited in the file of this patent

UNITED STATES PATENTS

| | | |
|---|---|---|
| 1,276,592 | Swinehart | Apr. 20, 1918 |
| 2,509,830 | MacMillan | May 30, 1950 |
| 2,854,692 | Robbins | Oct. 7, 1958 |